B. PROCTOR, Jr.
PICTURE FRAME.
APPLICATION FILED OCT. 11, 1921.

1,417,108. Patented May 23, 1922.

Inventor:
Benjamin Proctor Jr.
By Geo. K. Woodworth
Atty.

UNITED STATES PATENT OFFICE.

BENJAMIN PROCTOR, JR., OF WELLESLEY HILLS, MASSACHUSETTS.

PICTURE FRAME.

1,417,108.  Specification of Letters Patent.  Patented May 23, 1922.

Application filed October 11, 1921. Serial No. 506,952.

*To all whom it may concern:*

Be it known that I, BENJAMIN PROCTOR, Jr., a citizen of the United States, and a resident of Wellesley Hills in the county of Norfolk and State of Massachusetts, have invented a new and useful Improvement in Picture Frames, of which the following is a specification.

My invention relates to picture frames and its object is to provide a frame of such construction that an illusion of heightened perspective or an added distance effect, which is stereoscopic in nature, is given to the picture placed therein.

With this object in view my invention comprises a frame in which the area of the sight is smaller than the exposed area of the picture itself and in which the plane of the sight is in advance of the plane of the picture. The inner faces of the molding of the frame are constructed and arranged so as to form reflecting surfaces and preferably are inclined or curved rearwardly.

In the drawings which accompany and form a part of this specification,—

In the particular drawings selected for more fully disclosing my invention 10 represents the molding making up the picture frame, said molding having its front surface beaded or otherwise suitably shaped and ornamented as shown at 11.

Figure 1:
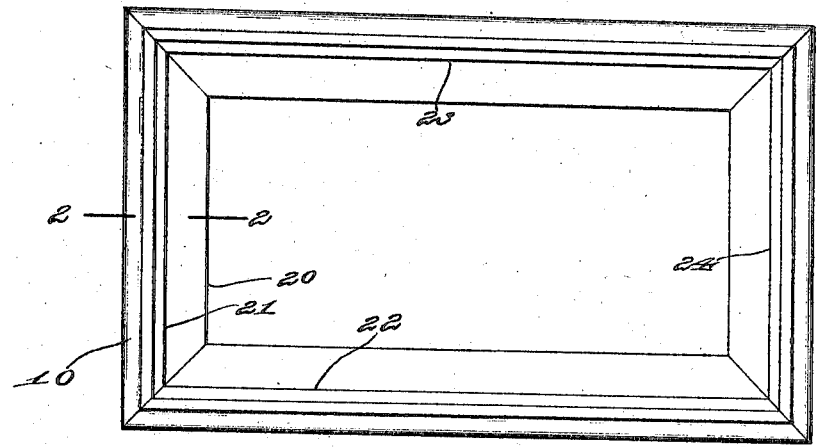
Figure 1 is a rear elevation of a picture frame involving my invention.
Figure 2:
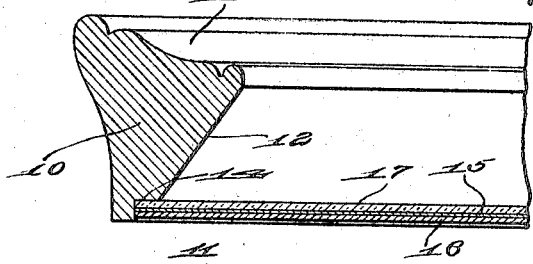
Fig. 2 is a section on an enlarged scale taken on the line 2—2 of Fig. 1.
Figure 3:
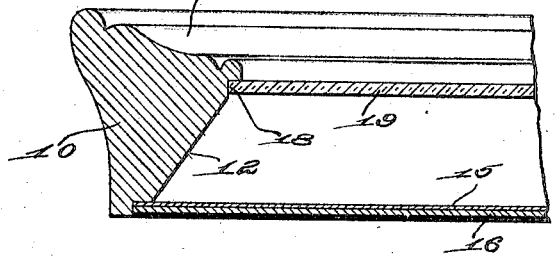
Fig. 3 is a similar section showing a modification.
Figure 4:
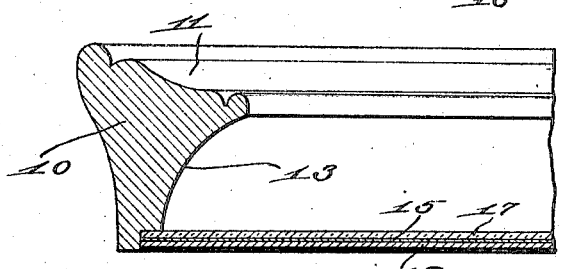
Fig. 4 is a similar section showing a further modification.

The inner face 12 of the molding is constructed and arranged so as to form a reflecting surface. As shown in Figs. 1, 2 and 3 such inner surface is beveled rearwardly, while in Fig. 4, it is rearwardly curved in the manner shown at 13 or in any other suitable manner. Preferably the inner surface of each of the molding members which make up the frame is painted with white enamel or other reflecting material to reflect the light-rays toward the picture.

The rearward end of each molding member is provided with a rabbet 14 for receiving the picture 15 and the backing 16. A glass plate 17 may be placed over the picture if desired.

As shown in Fig. 3 a rabbet 18 may be cut in the inner surface of each molding member near the juncture thereof with the front beaded surface 11 for receiving a glass plate 19 if desired.

The area of the sight 20, which is the opening through which the observer views the picture, is smaller than the exposed area of said picture, said exposed area being that which is bound by the lines 21, 22, 23 and 24, that is to say, the area of the opening of the frame at the rear end of the inner surfaces 12 of the molding members. The plane of the sight, that is to say, the plane of the opening of the frame at the forward end of said surfaces 12 is in advance of the plane of the picture by a substantial distance, for example, about one inch, the space between the plane of the sight and the plane of the picture being empty and unobstructed, so that the observer looks through the frame directly at the picture.

By virtue of the construction above described a picture placed in the frame will appear to have an added effect of distance and perspective, this effect or illusion being due to the fact that there is no visible connection between the frame and the picture.

It will be obvious that the principle underlying my invention may be embodied in a variety of structures and therefore I do not limit myself to the arrangements herein specifically described.

I claim:—

1. A picture frame having its moulding so arranged that the plane of the sight is in advance of the plane of the picture to be placed in said frame and the area of said sight smaller than the exposed area of said picture, the space between the plane of said sight and the plane of said picture being empty and unobstructed, whereby an illusion of heightened perspective or an added distance effect is given to said picture.

2. A picture frame having the plane of the sight in advance of the plane of the picture to be placed in said frame and the area of said sight smaller than the exposed area of said picture, the space between the plane of said sight and the plane of said picture being empty and unobstructed and the inner faces of its molding being rearwardly inclined.

In testimony whereof, I have hereunto subscribed my name this 10th day of October, 1921.

BENJAMIN PROCTOR, JR.